(12) United States Patent
Yotsuyanagi et al.

(10) Patent No.: US 11,608,116 B2
(45) Date of Patent: Mar. 21, 2023

(54) FRONT VEHICLE-BODY STRUCTURE OF VEHICLE

(71) Applicant: MAZDA MOTOR CORPORATION, Hiroshima (JP)

(72) Inventors: Taiki Yotsuyanagi, Aki-gun (JP); Ryo Shimoda, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 192 days.

(21) Appl. No.: 17/159,455

(22) Filed: Jan. 27, 2021

(65) Prior Publication Data

US 2021/0253171 A1   Aug. 19, 2021

(30) Foreign Application Priority Data

Feb. 15, 2020   (JP) .............................. JP2020-023886

(51) Int. Cl.
   *B62D 21/15*   (2006.01)
(52) U.S. Cl.
   CPC ......... *B62D 21/152* (2013.01); *B62D 21/157* (2013.01)
(58) Field of Classification Search
   CPC ........................... B62D 21/152; B62D 21/157
   USPC ................................................... 296/187.09
   See application file for complete search history.

(56) References Cited

U.S. PATENT DOCUMENTS

| | | | |
|---|---|---|---|
| 9,487,236 B2 * | 11/2016 | Ozawa ................. | B62D 21/152 |
| 2021/0253172 A1 * | 8/2021 | Shimoda .............. | B62D 21/152 |

FOREIGN PATENT DOCUMENTS

JP   2019-151133 A   9/2019

* cited by examiner

*Primary Examiner* — Joseph D. Pape
*Assistant Examiner* — Dana D Ivey
(74) *Attorney, Agent, or Firm* — Studebaker & Brackett PC

(57) ABSTRACT

A front vehicle-body structure is provided that allows for lower deceleration for occupants by facilitating breakage of frame members in the event of an oblique collision. Embodiments include a suspension housing formed with a suspension damper supporting portion, an upper arm supporting portion, and a lower arm supporting portion. A first frame connects an upper portion of the suspension housing and an upper portion on a vehicle-width-direction inner side of a dash panel, a second frame connects the upper portion of the suspension housing and an upper portion of a hinge pillar, and a third frame connects a lower portion of the suspension housing and a lower portion on the vehicle-width-direction inner side of the dash panel. In the event of an oblique collision, the first frame and the second frame break inward in vehicle plan view, and the third frame breaks in a Z-shape in vehicle plan view.

10 Claims, 10 Drawing Sheets

FRONT VEHICLE-BODY STRUCTURE OF VEHICLE

TECHNICAL FIELD

This disclosure relates to a front vehicle-body structure of a vehicle including a suspension housing formed with a suspension damper supporting portion, an upper arm supporting portion, and a lower arm supporting portion.

BACKGROUND

A conventional example of the above front vehicle-body structure of a vehicle is disclosed in Japanese Patent Laid-Open No. 2019-151133, wherein the front vehicle-body structure is provided with a suspension housing including a suspension damper supporting portion, an upper arm supporting portion, and a lower arm supporting portion and this suspension housing is formed by aluminum die casting to achieve both of reduced weight and secured support rigidity.

Also, in the conventional structure disclosed in Japanese Patent Laid-Open No. 2019-151133, an upper portion of the suspension housing and an upper portion on a vehicle-width-direction inner side of a dash panel are connected by an upper center frame, and the upper portion of the suspension housing and an upper portion of a hinge pillar are connected by an upper side frame.

In the structure disclosed in Japanese Patent Laid-Open No. 2019-151133, the upper center frame and the upper side frame can support a collision load in the event of a front-end collision of the vehicle. On the other hand, this structure has a problem in that, if these frames excessively brace the suspension housing in the event of an oblique collision of the vehicle, deceleration (gravity or so-called G) for occupants increases.

SUMMARY

Hence, this disclosure provides a front vehicle-body structure of a vehicle that allows for lower deceleration (so-called G) for occupants by facilitating breakage of frame members in the event of an oblique collision, which involves the largest load input.

A front vehicle-body structure of a vehicle according to this disclosure is a front vehicle-body structure of a vehicle including a suspension housing formed with a suspension damper supporting portion, an upper arm supporting portion, and a lower arm supporting portion, the front vehicle-body structure including a first frame connecting an upper portion of the suspension housing and an upper portion on a vehicle-width-direction inner side of a dash panel; a second frame connecting the upper portion of the suspension housing and an upper portion of a hinge pillar; and a third frame connecting a lower portion of the suspension housing and a lower portion on the vehicle-width-direction inner side of the dash panel, wherein in an event of an oblique collision, the first frame and the second frame are facilitated to break inward in vehicle plan view, and the third frame is facilitated to break in a Z-shape in vehicle plan view.

The above configuration allows the first frame and the second frame to break inward (break toward the inside in the vehicle width direction) and the third frame to break in a Z-shape in the event of an oblique collision, and this can restrain excessive bracing with these frames during the oblique collision, which involves the largest load input, and thereby allow for lower deceleration (so-called G) for occupants. The above configuration also enables stable and efficient absorption of the collision energy. Besides breakage in a complete Z-shape, the above Z-shaped breakage of the frame includes breakage in which a front portion thereof breaks outward and a rear portion thereof breaks inward, or vice versa.

Specifically, since bracing with the frames leads to increased deceleration for occupants, the frames are made to undergo breakage to thereby reduce the load transmission amount and allow for lower deceleration for occupants. Also, since excessive bracing with the frames leads to an increased load on the base ends of the frames, breakage is made to occur in portions thereof frontward of the frame base ends in order to avoid application of an excessive load to these frame base ends.

In one aspect of this disclosure, each of the first frame and the second frame is formed with a breakage facilitating bead extending in a vertical direction on a vehicle-width-direction outer-side portion thereof. This configuration allows each of the first frame and the second frame to break inward around the breakage facilitating bead in the event of an oblique collision.

In an aspect of this disclosure, the third frame is formed with breakage facilitating beads extending in a vertical direction on vehicle-width-direction inner and outer side portions of the third frame at positions offset from each other in a vehicle front-rear direction. This configuration allows the third frame to break in a Z-shape around the breakage facilitating beads in the event of an oblique collision.

In another aspect of this disclosure, the second frame is formed in a curved shape bulging toward an outside in a vehicle width direction so that a rear portion of the second frame breaks outward. This configuration allows the rear portion of the second frame to break outward to avoid application of shear stress to a base end of the second frame, and also allows the second frame to break substantially in a Z-shape in combination with the inward breakage by the above breakage facilitating bead. This ensures load absorption as the second frame undergoes breakage in its portion frontward of its base end while the base end of the second frame receives the input load.

In a further aspect of this disclosure, the front vehicle-body structure further includes another frame connecting the suspension housing and a vehicle cabin structural member, and the other frame is set to have a larger inclination angle with respect to a vehicle front-rear direction than each of the first to third frames.

The above configuration ensures load transmission by the first to third frames having relatively small inclination angles with respect to the vehicle front-rear direction in the event of an oblique collision and also improves support rigidity for the suspension housing by another frame having a relatively large inclination angle with respect to the vehicle front-rear direction.

This disclosure has advantageous effects of allowing for lower deceleration (so-called G) for occupants by facilitating breakage of the frame members in the event of an oblique collision, which involves the largest load input.

DETAILED DESCRIPTION

The present disclosure allows for lower deceleration (so-called G) for occupants by facilitating breakage of the frame members in the event of an oblique collision involving the largest load input is achieved by a front vehicle-body structure of a vehicle including a suspension housing formed with a suspension damper supporting portion, an upper arm supporting portion, and a lower arm supporting portion, the front vehicle-body structure including: a first frame connecting an upper portion of the suspension housing and an upper portion on a vehicle-width-direction inner side of a dash panel; a second frame connecting the upper portion of the suspension housing and an upper portion of a hinge pillar; and a third frame connecting a lower portion of the suspension housing and a lower portion on the vehicle-width-direction inner side of the dash panel, wherein in an event of an oblique collision, the first frame and the second frame are facilitated to break inward in vehicle plan view, and the third frame is facilitated to break in a Z-shape in vehicle plan view.

Figure 1:
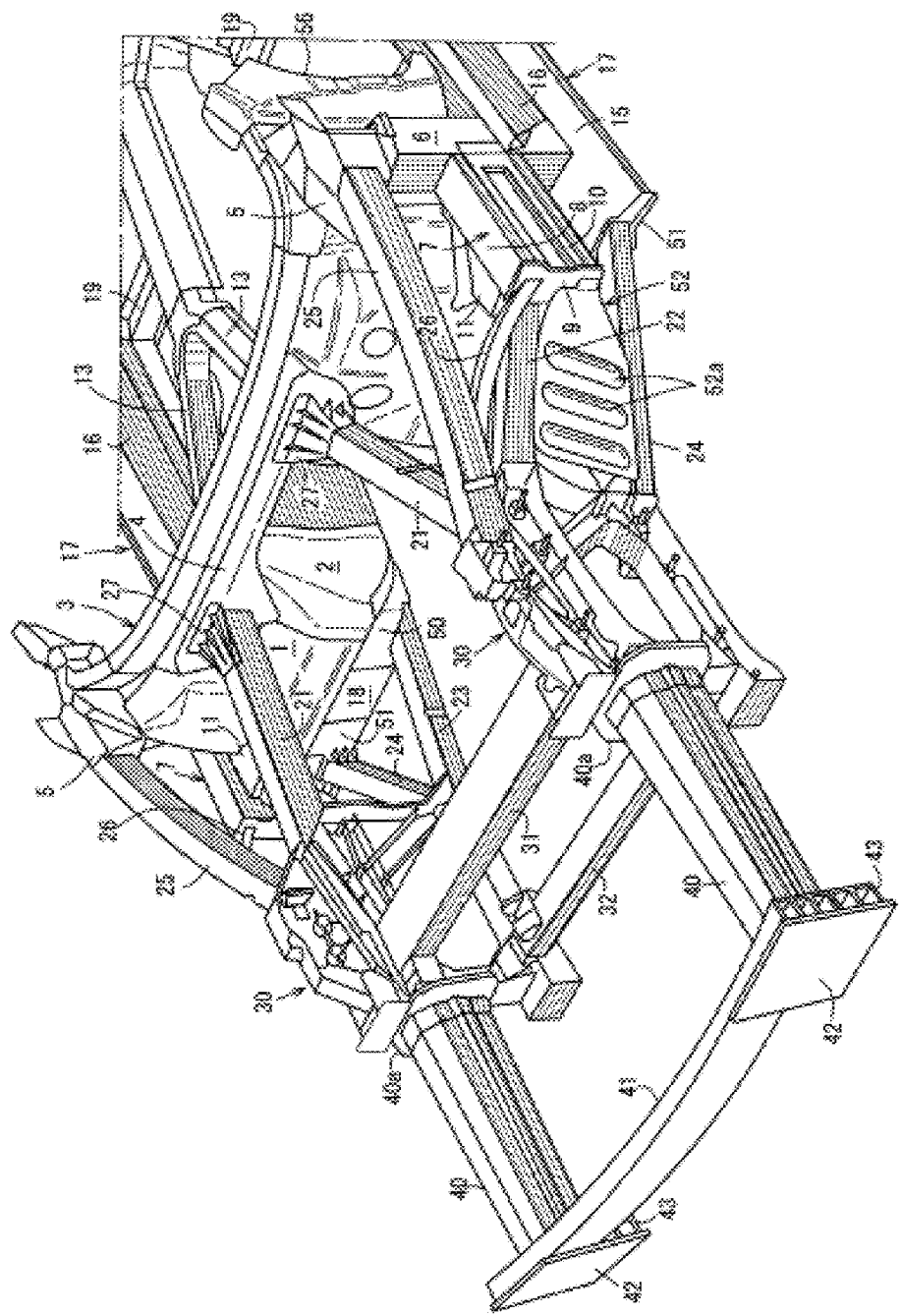
FIG. 1 is a perspective view of a front vehicle-body structure of a vehicle of the present disclosure.
Figure 4:
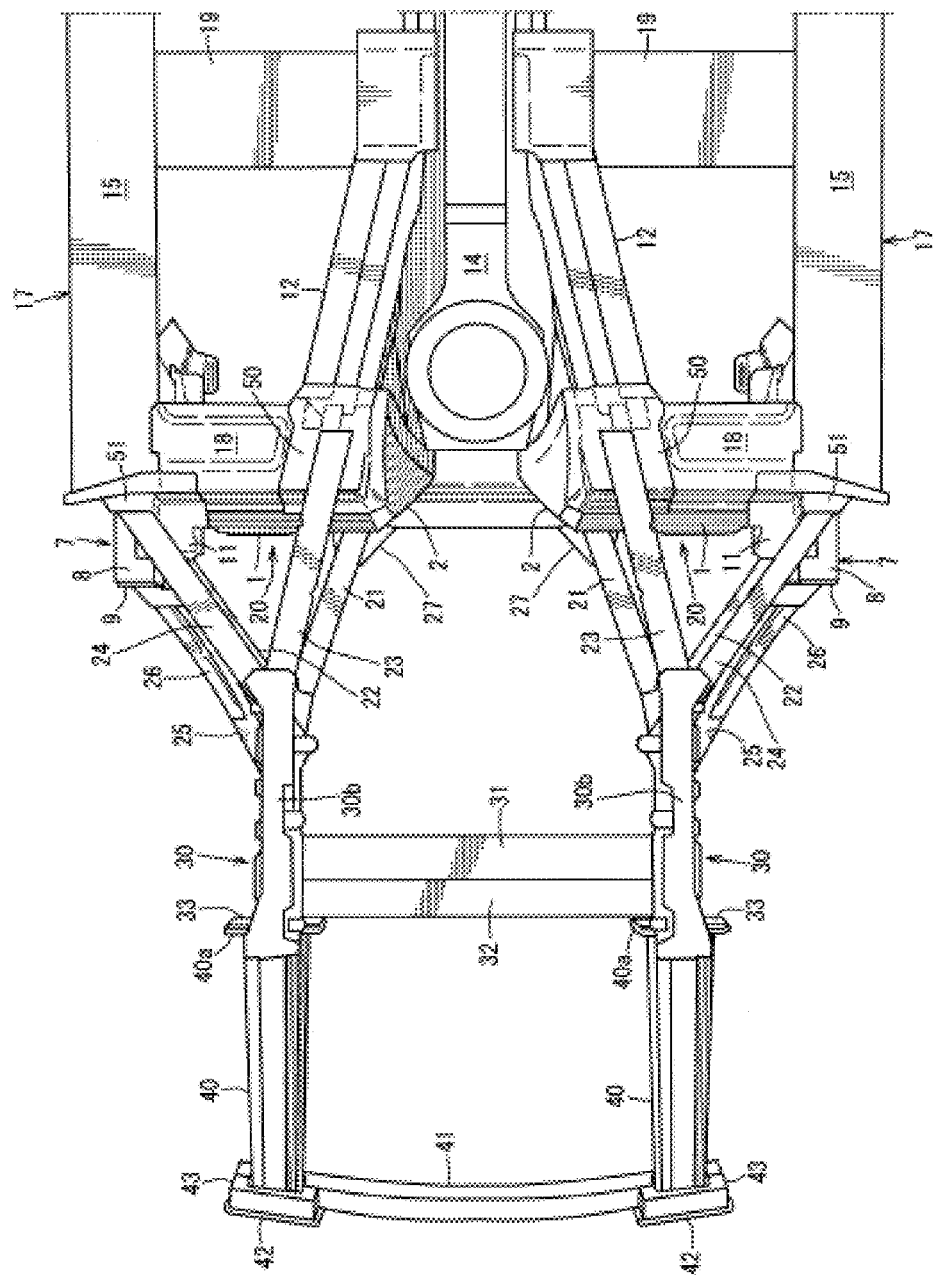
FIG. 4 is a bottom view of the front vehicle-body structure of the vehicle.
Figure 5:
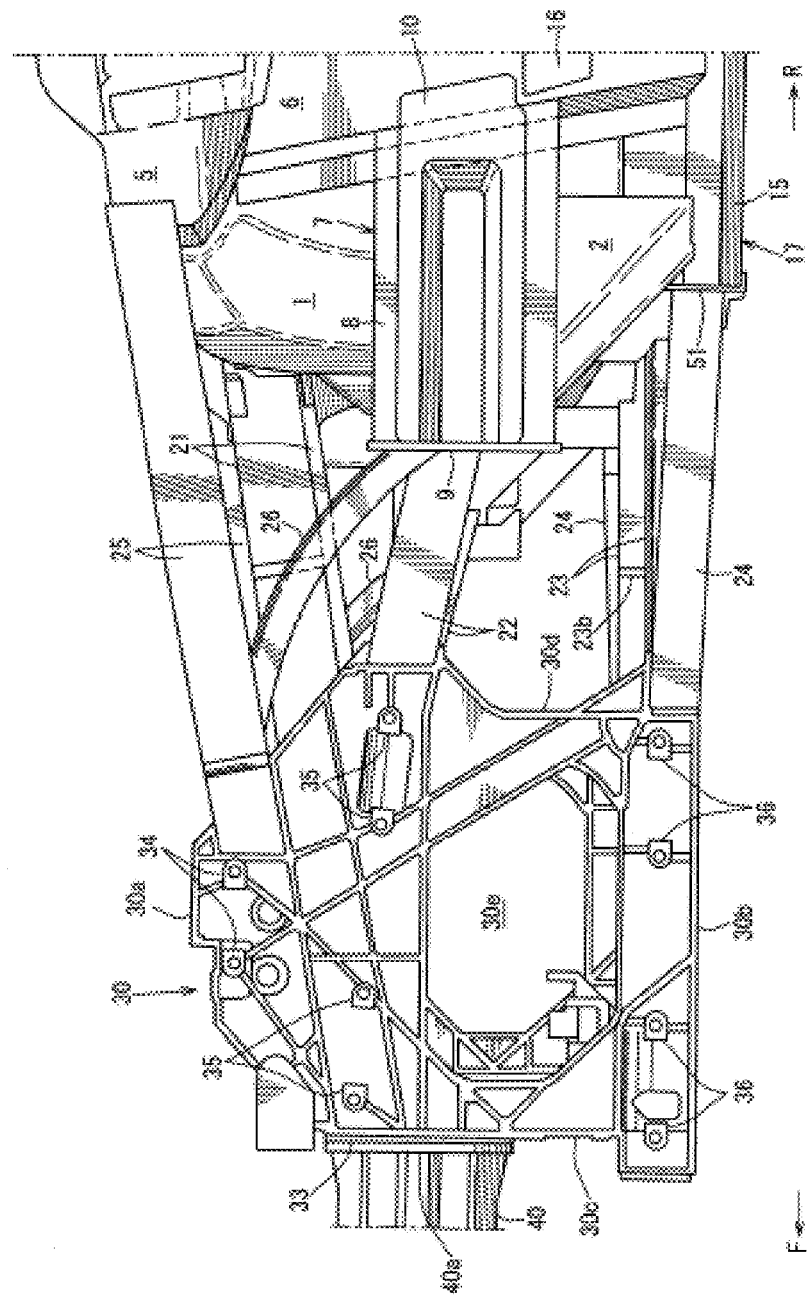
FIG. 5 is a side view of the front vehicle-body structure as viewed from a vehicle-width-direction outer side.

An embodiment of this disclosure will be described in detail below with reference to the drawings. The drawings illustrate a front vehicle-body structure of a vehicle; FIG. 1 is a perspective view of the front vehicle-body structure of the vehicle, FIG. 2 is a perspective view of the front vehicle-body structure of the vehicle with a connecting member in FIG. 1 removed, FIG. 3 is a plan view of the front vehicle-body structure of the vehicle, FIG. 4 is a bottom view of the front vehicle-body structure of the vehicle, and FIG. 5 is a side view of the front vehicle-body structure as viewed from a vehicle-width-direction outer side.

Figure 6:
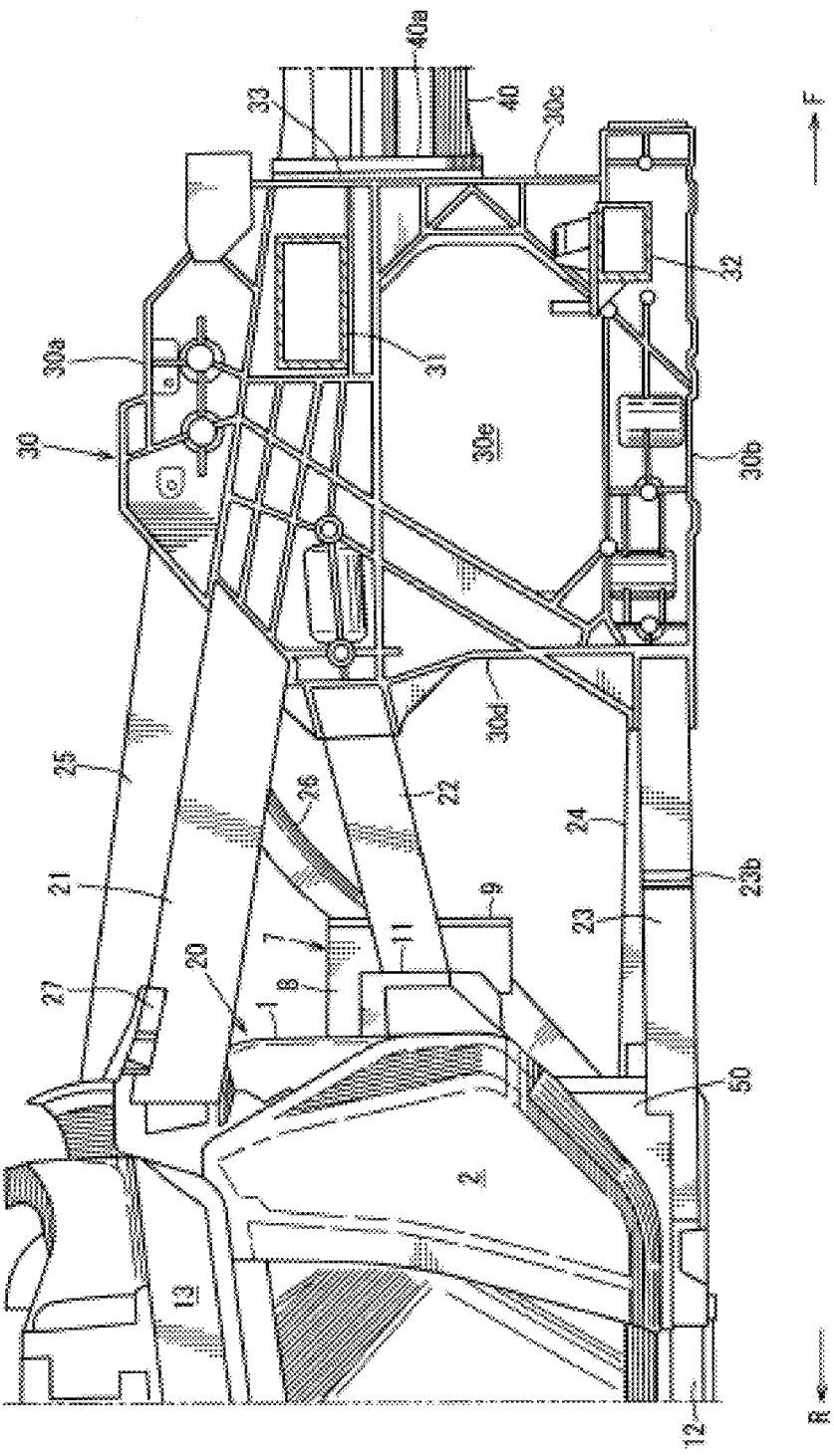
FIG. 6 is a side view of the front vehicle-body structure as viewed from a vehicle-width-direction inner side.
Figure 7:
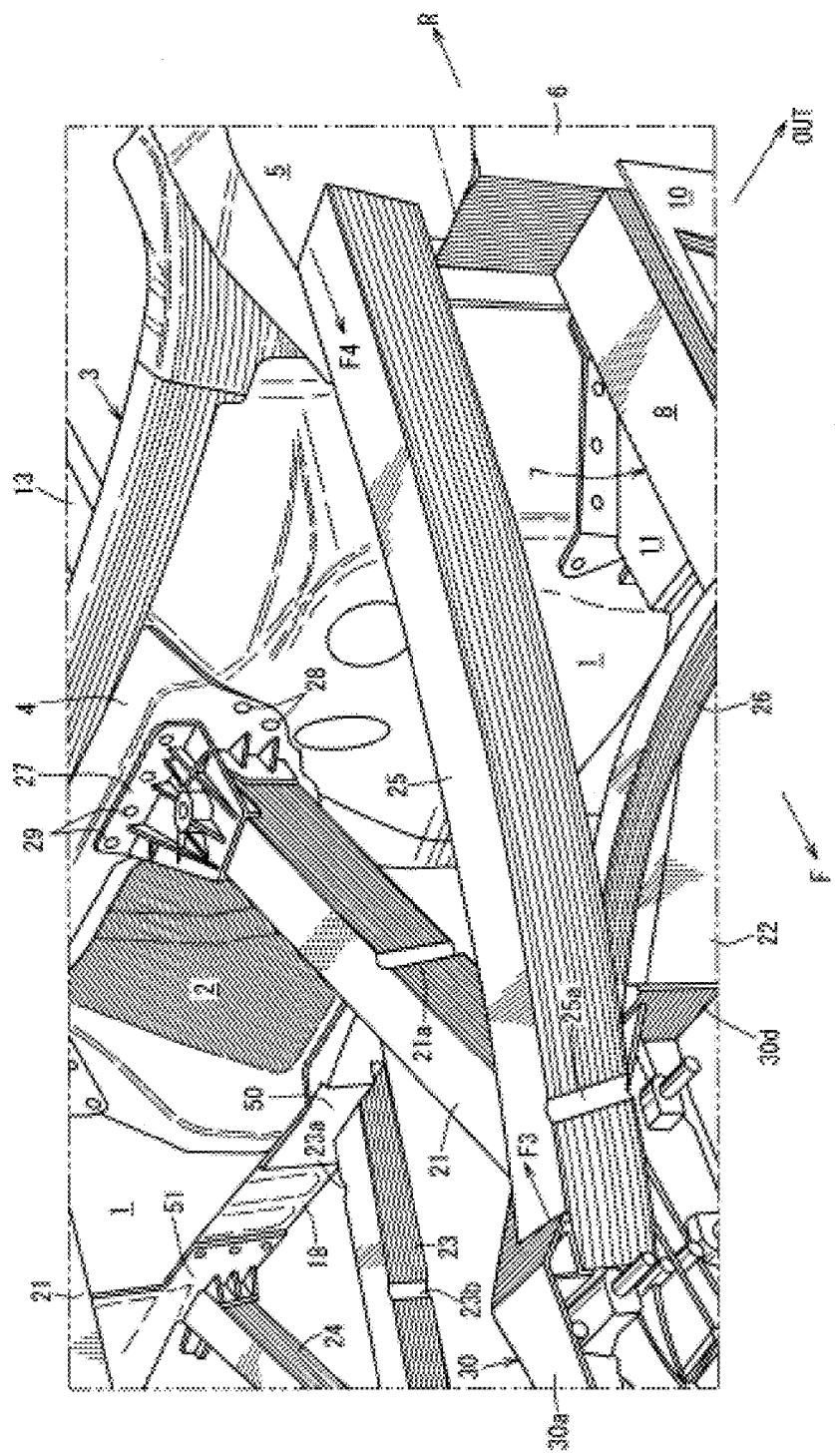
FIG. 7 is a perspective view of a frame connecting structure on a left side of the vehicle.
Figure 8:
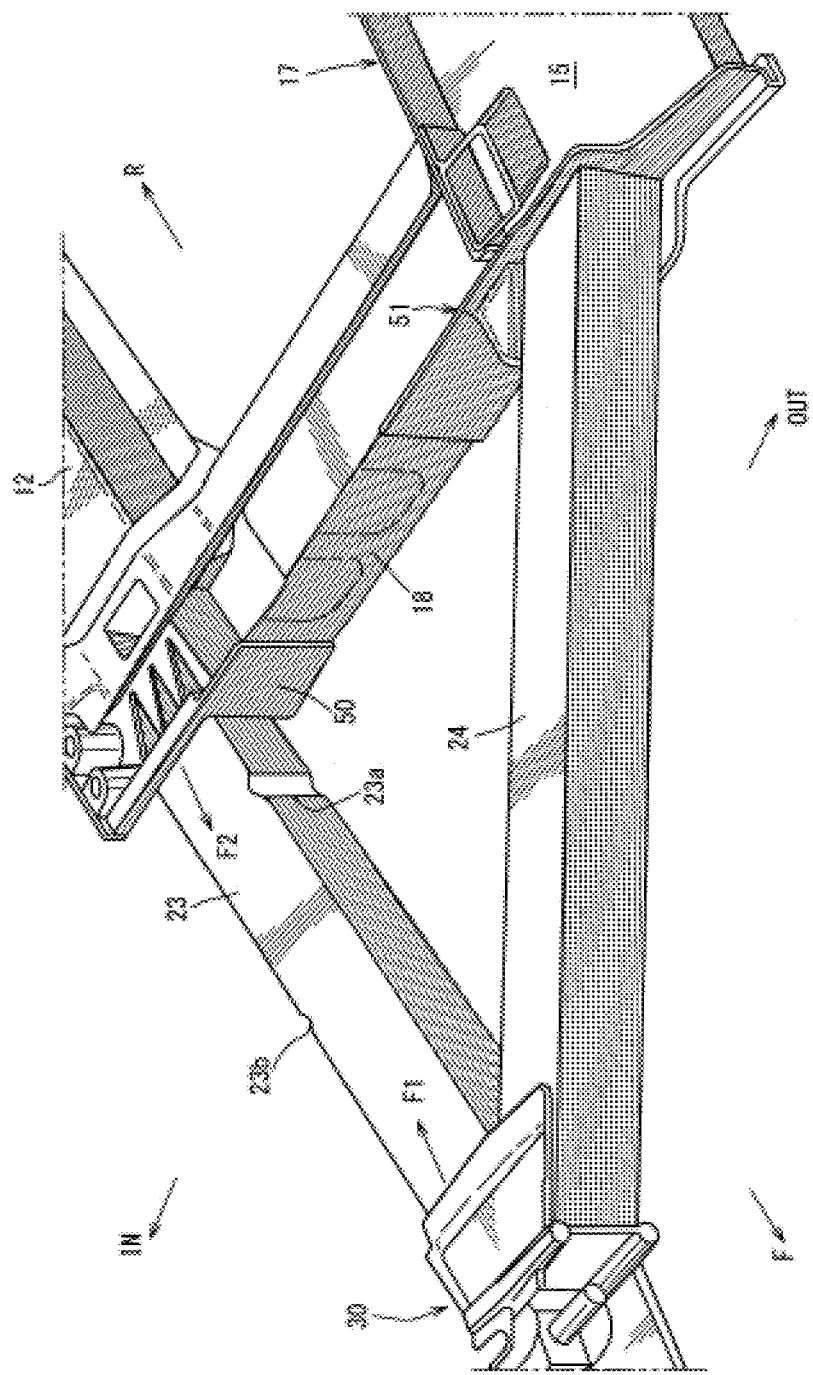
FIG. 8 is a perspective view of a frame connecting structure in a lower portion on the left side of the vehicle.
Figure 9:
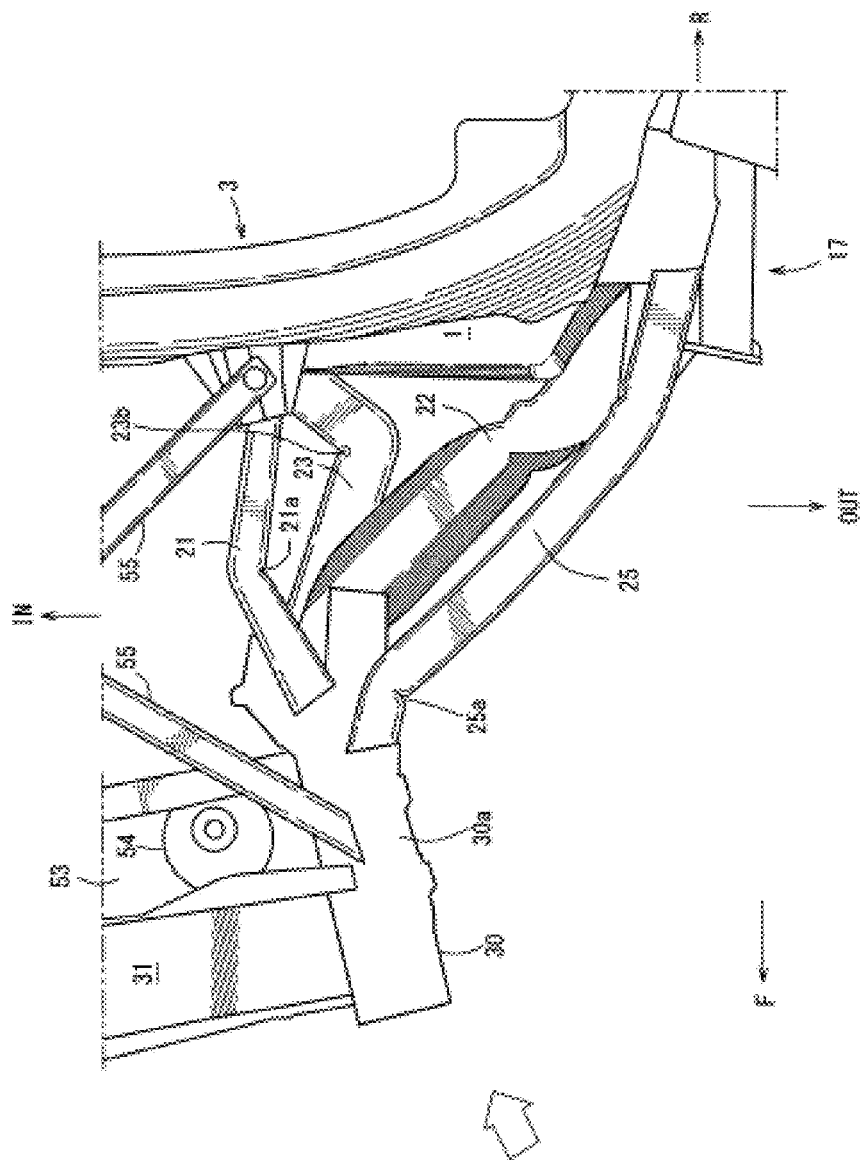
FIG. 9 is a plan view showing a breakage state of each frame in the event of an oblique collision.
Figure 10:
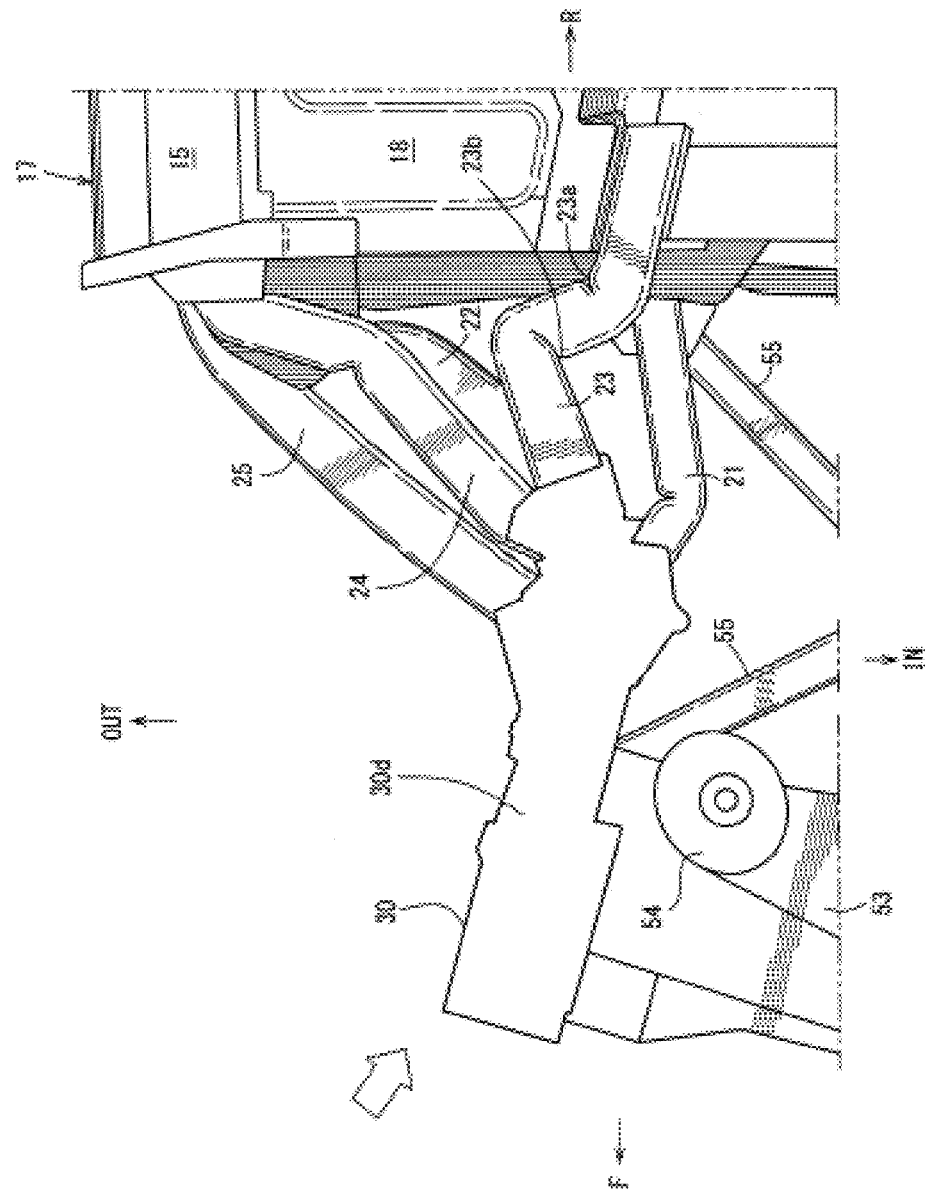
FIG. 10 is a bottom view showing a breakage state of each frame in the event of an oblique collision.

FIG. 6 is a side view of the front vehicle-body structure as viewed from a vehicle-width-direction inner side, FIG. 7 is a perspective view of a frame connecting structure on a left side of the vehicle, and FIG. 8 is a perspective view of a frame connecting structure in a lower portion on the left side of the vehicle. FIG. 9 is a plan view showing a breakage state of each frame in the event of an oblique collision, and FIG. 10 is a bottom view showing a breakage state of each frame in the event of an oblique collision. In the drawings, an arrow F represents a vehicle frontward direction, an arrow R represents a vehicle rearward direction, an arrow IN represents an inward direction in a vehicle width direction, and an arrow OUT represents an outward direction in the vehicle width direction.

Figure 2:
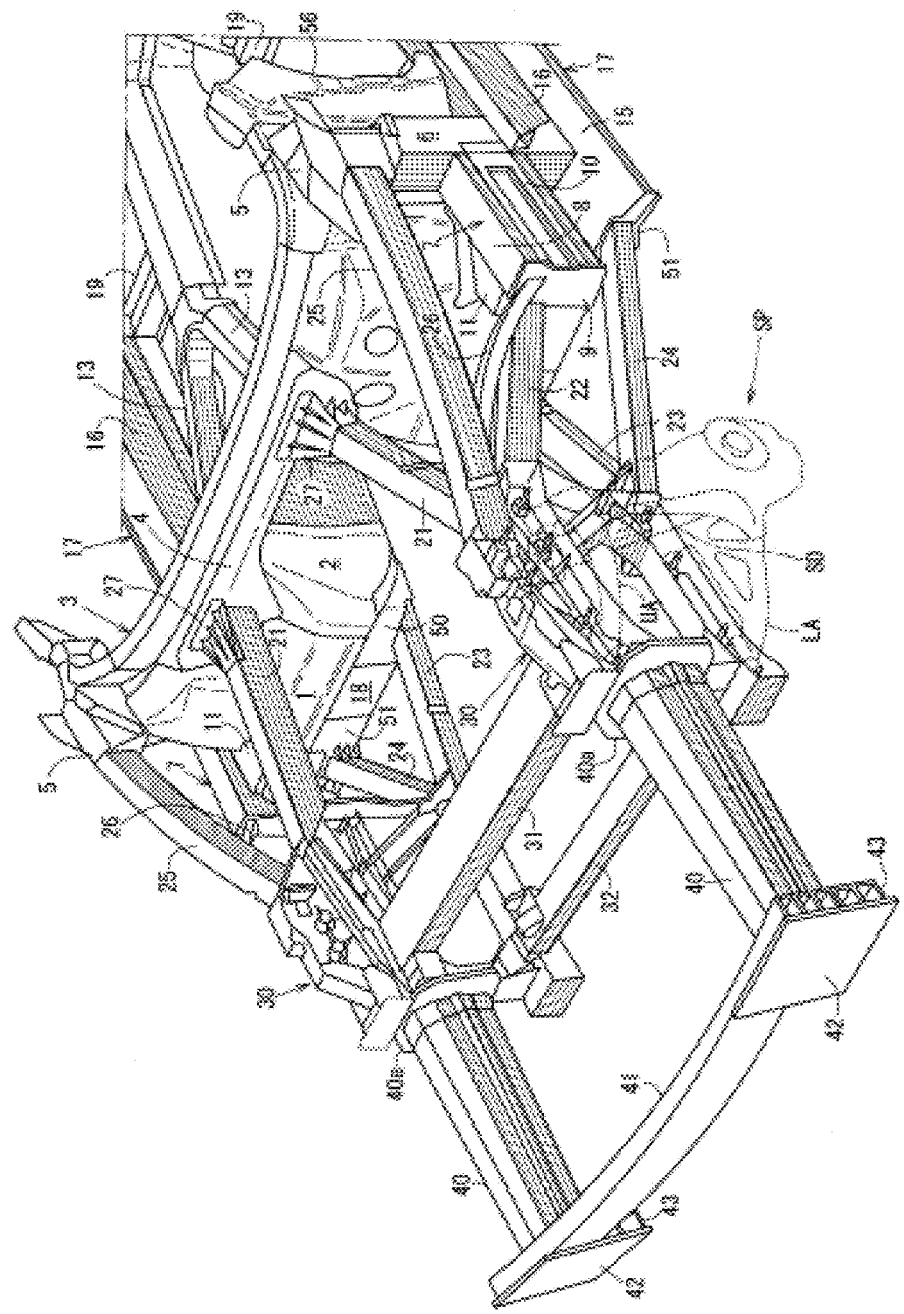
FIG. 2 is a perspective view of the front vehicle-body structure of the vehicle with a connecting member in FIG. 1 removed.
Figure 3:
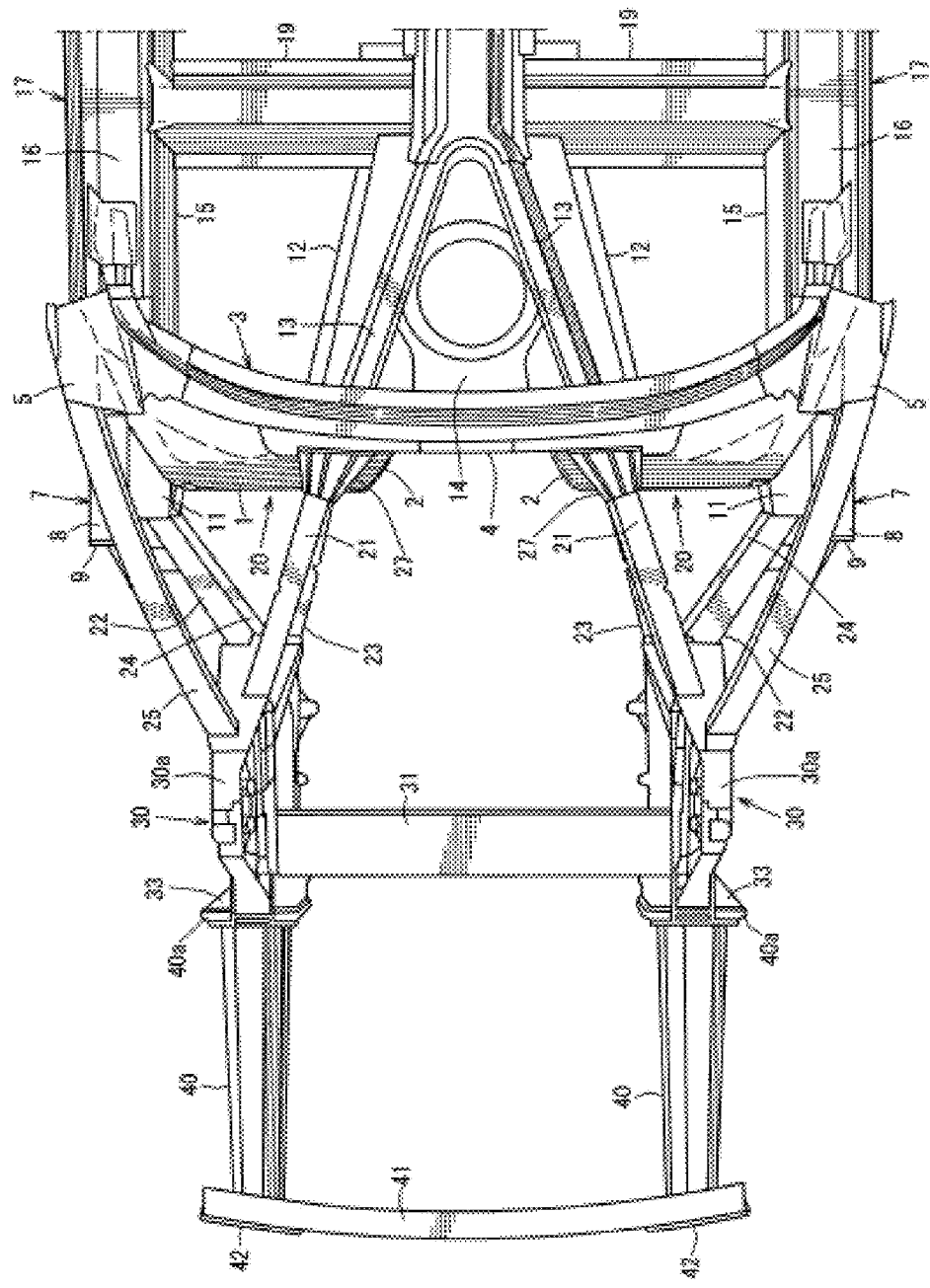
FIG. 3 is a plan view of the front vehicle-body structure of the vehicle.

As shown in FIGS. 2 and 3, a dash panel 1 separating an engine room from a vehicle cabin in a vehicle front-rear direction is provided. A tunnel portion 2 is formed at the center in the vehicle width direction of the dash panel 1, and a cowl portion 3 is disposed on an upper end of the dash panel 1. As shown in FIGS. 2 and 3, a dash panel reinforcement member 4 extending in the vehicle width direction is connected and fixed to an upper front side of the dash panel 1.

As shown in FIGS. 1 and 2, a hinge pillar 6 is fixed in a standing manner to each of left and right ends of the dash panel 1 in the vehicle width direction. The hinge pillar 6 includes a junction member 5 on its upper portion. The hinge pillar 6 is formed of an aluminum alloy extruded member.

As shown in FIGS. 1 and 2, a tire stopper 7 is connected and fixed to a front portion of the hinge pillar 6. The tire stopper 7 includes a rectangular pipe 8 formed of an aluminum extruded material and extending from the front portion of the hinge pillar 6 toward a vehicle front side, a front plate 9 attached to a front end of the rectangular pipe 8, and a side plate 10 attached to an outer side portion of the rectangular pipe 8. As shown in FIGS. 1 and 2, a junction member 11 is connected and fixed between a vehicle-width-direction inner side of the tire stopper 7 and the front portion of the dash panel 1.

As shown in FIGS. 3 and 4, a pair of left and right lower tunnel frames 12, 12 are provided in a lower portion of the tunnel portion 2, and as shown in FIG. 3, upper tunnel frames 13 assembled in a V-shape in vehicle plan view are provided in an upper portion of the tunnel portion 2. Note that reference numeral 14 in FIGS. 3 and 4 denotes a tunnel panel.

As shown in FIGS. 1 and 2, a side sill lower member 15 extending in the vehicle front-rear direction is provided at a lower end of the hinge pillar 6, and a side sill upper member 16 extending in the vehicle front-rear direction is provided at a lower portion on the vehicle-width-direction outer side of the hinge pillar 6. The side sill lower member 15 and the side sill upper member 16 constitute a side sill 17. Both of the side sill lower member 15 and the side sill upper member 16 are formed of an aluminum alloy extruded member.

As shown in FIG. 4, a front end of the side sill lower member 15 and a front end of the lower tunnel frame 12 are connected by a torque box 18 extending in the vehicle width direction. As shown in FIGS. 3 and 4, floor cross members 19, 19 extending in the vehicle width direction are provided each between a portion of the tunnel portion 2 corresponding to the vehicle cabin and an intermediate portion in the vehicle front-rear direction of the corresponding side sill 17. A closed cross-section extending in the vehicle width direction is formed between each floor cross member 19 and a floor panel (not shown). The above elements including the dash panel 1, the hinge pillar 6, the side sill 17, and the torque box 18 constitute a vehicle cabin structural member 20 (see FIGS. 3 and 4).

As shown in FIGS. 1, 2, 5, and 6, a suspension housing 30 is provided on each of left and right sides of the engine compartment at the front of the dash panel 1. The suspension housing 30 is made by aluminum die casting. Front upper portions of the pair of left and right suspension housings 30 are connected by an upper cross member 31 extending in the vehicle width direction, and front lower portions of the pair of left and right suspension housings 30 are connected by a lower cross member 32 extending in the vehicle width direction. The suspension housing 30 and the vehicle cabin structural member 20 are connected by multiple frames 21-25. A connecting structure using these frames 21-25 will be described later.

As shown in FIGS. 1 and 2, a crash box 40 as a shock absorbing member is fastened and fixed to a front face of each of the pair of left and right suspension housings 30 via a set plate 33 (see FIGS. 5 and 6). The crash box 40 is formed of fiber reinforced plastic (so-called FRP), and a flange portion 40a integrally formed at a rear base end of the crash box 40 is co-fastened and fixed to the set plate 33 and the suspension housing 30 with fastening members such as bolts and nuts.

As shown in FIGS. 1 to 4, a bumper reinforcement 41 made of an aluminum alloy extruded member is attached between front ends of the pair of left and right crash boxes 40, 40. Specifically, a bumper stay 42 made of aluminum alloy is provided to the bumper reinforcement 41 at a position thereof corresponding to the crash box 40, and the front end of the crash box 40 is fastened and fixed to the bumper stay 42.

As shown in FIG. 4, a bumper stay reinforcement member 43 made of aluminum alloy is provided to reinforce the bumper stay 42. A concave cutout portion is formed on each of the bumper stay reinforcement member 43 and the bumper reinforcement 41 at positions thereof corresponding to the crash box 40. The front end of the crash box 40 is fastened and fixed to the bumper stay 42, and the bumper reinforcement 41, the bumper stay reinforcement member 43, and the bumper stay 42 are joined and fixed to each other by MIG welding means.

As shown in FIGS. 5 and 6, the suspension housing 30 includes an upper side portion 30a, a lower side portion 30b, a front side portion 30c, a rear side portion 30d, and an opening 30e surrounded by these side portions 30a-30d. As shown in FIG. 5, the suspension housing 30 is formed with a suspension damper supporting portion 34 at an intermediate portion of the upper side portion 30a in the vehicle front-rear direction, with upper arm supporting portions 35 on front and rear sides of the upper side portion 30a, and with lower arm supporting portions 36 on front and rear sides of the lower side portion 30b.

The suspension damper supporting portion 34 supports an upper end of a suspension damper SD of a suspension SP shown in FIG. 2, the upper arm supporting portions 35 support a vehicle body-side pivot portion of an upper arm UA, and the lower arm supporting portions 36 support a vehicle body-side pivot portion of a lower arm LA.

The suspension housing 30 is connected to the vehicle cabin structural member 20 by the multiple frames 21-25 (specifically, frame members made of aluminum alloy extruded members), and so below a description will be given of a connecting structure for the suspension housing 30 using the frames 21-25.

As shown in FIGS. 6 and 7, an upper portion of the suspension housing 30 and an upper portion on the vehicle-width-direction inner side of the dash panel 1 are connected by an upper inner frame 21 via the dash panel reinforcement member 4 and a bracket 27. The dash panel reinforcement member 4 is fastened and fixed to an upper front face of the dash panel 1 with fastening members 28, and the bracket 27 is fastened and fixed to a front portion of the dash panel reinforcement member 4 with fastening members 29. A front end of the upper inner frame 21 and the suspension housing 30 are joined and fixed by MIG welding, a rear end of the upper inner frame 21 and the bracket 27 are also joined and fixed by MIG welding.

As shown in FIGS. 3 and 6, the upper portion of the suspension housing 30 and a front portion of the hinge pillar 6 are connected by an upper outer frame 22 via the junction member 11. The junction member 11 is connected to a vehicle-width-direction inner-side portion of the tire stopper 7 and the front face of the dash panel 1. A front end of the upper outer frame 22 and the suspension housing 30 are joined and fixed by MIG welding, and a rear end of the upper outer frame 22 and the junction member 11 are also joined and fixed by MIG welding.

As shown in FIGS. 6 and 8, a lower portion of the suspension housing 30 and a lower portion on the vehicle-width-direction inner side of the dash panel 1 are connected by a lower inner frame 23 via the torque box 18 and a bracket 50. The bracket 50 is fastened and fixed to the torque box 18 with fastening members. A front end of the lower inner frame 23 and the suspension housing 30 are joined and fixed by MIG welding, and a rear end of the lower inner frame 23 and the bracket 50 are also joined and fixed by MIG welding.

As shown in FIGS. 5 and 8, the lower portion of the suspension housing 30 and a lower portion of the hinge pillar 6 are connected by a lower outer frame 24 via the side sill lower member 15, the torque box 18, and a bracket 51. The bracket 51 is fastened and fixed to the torque box 18 with fastening members. A front end of the lower outer frame 24 and the suspension housing 30 are joined and fixed by MIG welding, and a rear end of the lower outer frame 24 and the bracket 51 are also joined and fixed by MIG welding.

With this configuration, at the upper portion of the suspension housing 30, a truss structure (see FIG. 3) is formed in vehicle plan view by the upper inner frame 21, the upper outer frame 22, and the dash panel 1 including the hinge pillar 6 while, at the lower portion of the suspension housing 30, a truss structure (see FIG. 4) is formed in vehicle plan view by the lower inner frame 23, the lower outer frame 24, and the dash panel 1 including the hinge pillar 6.

Put simply, by connecting the suspension housing 30 to the vehicle body by at least the four frames 21, 22, 23, 24 and thus forming the truss structures between the suspension housing 30 and vehicle body members, the above configuration allows the suspension housing 30 to be supported with high rigidity and ensures effective load transmission.

As shown in FIGS. 7 and 8, the upper inner frame 21, the upper outer frame 22, the lower inner frame 23, and the lower outer frame 24 are each formed of an aluminum alloy extruded member and shaped into a hollow rectangular pipe. This configuration reduces weight of the frames 21-24 while ensuring effective load transmission by the upper and lower truss structures.

As shown in the bottom view of FIG. 4, the lower outer frame 24 is set to have a larger inclination angle with respect to the vehicle front-rear direction than the lower inner frame 23. This configuration allows most of the load coming from a full-overlap collision or an offset collision to be input to the lower inner frame 23, which has a relatively small inclination angle with respect to the vehicle front-rear direction. This, in turn, reduces a shear stress acting on the rear end of the lower inner frame 23 as compared to the conventional structure disclosed in Patent Literature 1, ensuring effective load transmission.

As shown in FIGS. 3 and 7, an upper end of the suspension housing 30 and an upper end of the hinge pillar 6 are connected by an upper end outer frame 25 via the junction member 5. The junction member 5 is connected and fixed to the upper end of the hinge pillar 6.

A front end of the upper end outer frame 25 and the suspension housing 30 are joined and fixed by MIG welding, and a rear end of the upper end outer frame 25 and the junction member 5 are also joined and fixed by MIG welding. This configuration improves support rigidity provided by the upper end outer frame 25 for the suspension housing 30. The upper end outer frame 25 is also formed of an aluminum alloy extruded member and shaped into a rectangular pipe.

As shown in FIG. 7, a breakage facilitating bead 21a is formed on a vehicle width outer side of the upper inner frame 21 at an intermediate portion thereof in the front-rear direction. As shown in FIG. 7, a breakage facilitating bead 25a is also formed on a vehicle width outer side of the upper end outer frame 25 at a front portion thereof. Additionally, as shown in FIG. 8, breakage facilitating beads 23a, 23b are formed respectively on a vehicle width outer side of the lower inner frame 23 near a base end thereof and on a vehicle width inner side of the lower inner frame 23 at an intermediate portion thereof in the front-rear direction. This configuration restrains excessive bracing with the above frames 21, 25, 23 and thereby improves a collision energy absorption effect.

Additionally, as shown in FIG. 1, a connecting member 52 made of aluminum alloy is provided to connect the upper outer frame 22 and the lower outer frame 24 in a vertical direction. This configuration improves responsivity of a vehicle behavior by connecting the upper outer frame 22 and the lower outer frame 24 in the vertical direction with high rigidity and thus restraining torsion of the vehicle body.

The connecting member 52 is joined and fixed by MIG welding to the upper outer frame 22 and the lower outer frame 24. Also, the connecting member 52 is integrally formed with multiple beads 52a extending in an up-down direction, which improves rigidity of the connecting member 52 itself.

Additionally, as shown in FIG. 5, a reinforcement frame 26 is provided to arcuately connect a front bottom face of the upper end outer frame 25 and a front face of the tire stopper 7. A front end of the reinforcement frame 26 and the front bottom face of the upper end outer frame 25 are connected and fixed by MIG welding, and a rear end of the reinforcement frame 26 and a front plate 9 on the front face of the tire stopper 7 are also connected and fixed by MIG welding.

The above configuration facilitates inward breakage of the upper inner frame 21 and a front portion of the upper end outer frame 25 and also facilitates Z-shaped breakage of the lower inner frame 23 in vehicle plan view in the event of an oblique collision of the vehicle.

This configuration allows the upper inner frame 21 and the upper end outer frame 25 to break inward (break toward the inside in the vehicle width direction) and the lower inner frame 23 to break in a Z-shape in the event of an oblique collision as shown in FIGS. 9 and 10, and this can restrain excessive bracing with the frames 21, 25, 23 during the oblique collision, which involves the largest load input, and thereby allow for lower deceleration (so-called G) for occupants. To make the above inward breakage take place, the upper inner frame 21 and the upper end outer frame 25 are respectively formed with the breakage facilitating beads 21a, 25a extending in the vertical direction on their respective vehicle width outer sides (see FIG. 7).

This configuration allows the upper inner frame 21 and the front portion of the upper end outer frame 25 to break inward around the breakage facilitating beads 21a, 25a, respectively, in the event of an oblique collision as shown in FIGS. 9 and 10.

Also, to make the above Z-shaped breakage take place, the lower inner frame 23 is formed with the breakage facilitating beads 23a, 23b extending in the vertical direction on vehicle-width-direction inner and outer side portions of the lower inner frame 23 at positions offset from each other in the vehicle front-rear direction, as shown in FIG. 8. This configuration allows the lower inner frame 23 to break in a Z-shape around the breakage facilitating beads 23a, 23b in the event of an oblique collision as shown in FIGS. 9 and 10.

As shown in FIG. 7, the upper end outer frame 25 is formed in a curved shape bulging toward the outside in the vehicle width direction so that a rear portion thereof breaks outward. This allows the rear portion of the upper end outer frame 25 to break outward (see FIGS. 9 and 10) to avoid application of the shear stress to a base end of the upper end outer frame 25, and also allows the upper end outer frame 25 to break substantially in a Z-shape in vehicle plan view in combination with the inward breakage facilitated by the breakage facilitating bead 25a. This configuration ensures load absorption as the upper end outer frame 25 undergoes breakage in its portion frontward of its base end while the base end receives the input load.

Separately from the above frames 21, 25, 23, the upper outer frame 22 and the lower outer frame 24 are provided each as another frame to connect the suspension housing 30 and the vehicle cabin structural member 20. The upper outer frame 22 and the lower outer frame 24 are set to have larger inclination angles with respect to the vehicle front-rear direction than the upper inner frame 21, the upper end outer frame 25, and the lower inner frame 23.

This configuration ensures load transmission by the upper inner frame 21, the upper end outer frame 25, and the lower inner frame 23, which have relatively small inclination angles with respect to the vehicle front-rear direction, in the event of an oblique collision and also improves support rigidity for the suspension housing 30 by the other frames having relatively large inclination angles with respect to the vehicle front-rear direction, namely the upper outer frame 22 and the lower outer frame 24. Note that in FIGS. 9 and 10, reference numeral 53 denotes a subframe, reference numeral 54 denotes an engine mount member, and reference numeral 55 denotes a tower bar. In FIGS. 1 and 2, reference numeral 56 denotes a hinge pillar outer.

In this embodiment, the five frames 21-25 are provided on each side to connect the suspension housing 30 and the vehicle cabin structural member 20 as shown in FIGS. 1 and 2, and in the event of an oblique collision, at least one of these multiple frames 21-25 (the lower inner frame 23 and the upper end outer frame 25 in this embodiment) is facilitated to break in a Z-shape in vehicle plan view as shown in FIGS. 9 and 10.

As the above frames 23, 25 break in a Z-shape and thus absorb collision energy in the event of an oblique collision, this configuration can restrain a load in a shear direction from being input to the connecting portions on front and rear sides of the frames 23, 25 and thus allow for lower deceleration (so-called G) for occupants in the event of the oblique collision involving the largest load input.

Also, at least one of the multiple frames 21-25, namely the lower inner frame 23, is formed with the breakage facilitating beads 23a, 23b that extend in the vertical direction on the vehicle-width-direction inner and outer side portions of the lower inner frame 23 at positions offset from each other in the vehicle front-rear direction (see FIG. 8). This configuration allows the lower inner frame 23 to break in a Z-shape around the breakage facilitating beads 23a, 23b in the event of an oblique collision as shown in FIGS. 9 and 10, ensuring the collision energy absorption.

Further, at least another one of the multiple frames 21-25, namely the frame 25, is formed in a curved shape bulging toward the outside in the vehicle width direction and is formed with the breakage facilitating bead 25a that extend in the vertical direction on the vehicle-width-direction outer-side portion of the upper end outer frame 25 (see FIG. 7). This configuration allows the upper end outer frame 25 to break in a Z-shape in vehicle plan view by virtue of the combination of its curved shape and the breakage facilitating bead 25a, ensuring the load absorption.

Further, at least one of the multiple frames 21-25 (in this embodiment, the lower inner frame 23 and the upper end outer frame 25) is inclinedly disposed with a rear end thereof offset in the vehicle width direction relative to a front end thereof such that a load in the front-rear direction is input to the connecting portions of the frames 23, 25 in the event of an oblique collision (see F1-F4 in FIGS. 7 and 8).

Thus, in the event of an oblique collision, a load F1 is input to a front end connecting portion of the lower inner frame 23 connected to the suspension housing 30, from the front end toward the vehicle rear side as shown in FIG. 8, and a reaction force F2 parallel to the load F1 acts on a rear end connecting portion of the lower inner frame 23 connected to the vehicle cabin structural member 20, from the rear end toward the vehicle front side.

Likewise, in the event of an oblique collision, a load F3 is input to a front end connecting portion of the upper end outer frame 25 connected to the suspension housing 30, from the front end toward the vehicle rear side as shown in FIG. 7, and a reaction force F4 parallel to the load F3 acts on a rear end connecting portion of the upper end outer frame 25 connected to the vehicle cabin structural member 20, from the rear end toward the vehicle front side.

As a result, by effectively breaking the inclinedly disposed frames 23, 25 in a Z-shape as shown in FIGS. 9 and 10, this configuration not only ensures the load absorption and allows for lower deceleration (so-called G) for occupants, but also further restrains the load in the sear direction from being input to the connecting portions.

As described above, the front vehicle-body structure of the vehicle of the above embodiment includes the suspension housing 30 formed with the suspension damper supporting portion 34, the upper arm supporting portion 35, and the lower arm supporting portion 36, and includes the first frame (upper inner frame 21) connecting the upper portion of the suspension housing 30 and the upper portion on the vehicle-width-direction inner side of the dash panel; the second frame (upper end outer frame 25) connecting the upper portion of the suspension housing 30 and the upper portion of the hinge pillar 6; and the third frame (lower inner frame 23) connecting the lower portion of the suspension housing 30 and the lower portion on the vehicle-width-direction inner side of the dash panel 1. In the event of an oblique collision, the first frame (upper inner frame 21) and the second frame (upper end outer frame 25) are facilitated to break inward in vehicle plan view, and the third frame (lower inner frame 23) is facilitated to break in a Z-shape in vehicle plan view (see FIGS. 7 and 8).

This configuration allows the first frame (upper inner frame 21) and the second frame (upper end outer frame 25) to break inward (break toward the inside in the vehicle width direction) and the third frame (lower inner frame 23) to break in a Z-shape in the event of an oblique collision, and this can restrain excessive bracing with the frames 21, 25, 23 during the oblique collision, which involves the largest load input, and thereby allow for lower deceleration (so-called G) for occupants.

Specifically, since bracing with the frames 21, 25, 23 leads to increased deceleration for occupants, the frames 21, 25, 23 are made to undergo breakage to thereby reduce the load transmission amount and allow for lower deceleration for occupants. Also, since excessive bracing with the frames 21, 25, 23 leads to an increased load on the base ends of the frames 21, 25, 23, breakage is made to occur in portions thereof frontward of the frame base ends in order to avoid application of an excessive load to these frame base ends.

In one embodiment of this disclosure, the first frame (upper inner frame 21) and the second frame (upper end outer frame 25) are formed with the breakage facilitating beads 21a, 25a extending in the vertical direction on their respective vehicle-width-direction outer-side portions (see FIG. 7). This configuration allows the first frame (upper inner frame 21) and the second frame (upper end outer frame 25) to break inward respectively around the breakage facilitating beads 21a, 25a in the event of an oblique collision.

In another embodiment of this disclosure, the third frame (lower inner frame 23) is formed with the breakage facilitating beads 23a, 23b extending in the vertical direction on the vehicle-width-direction inner and outer side portions thereof at positions offset from each other in the vehicle front-rear direction (see FIG. 8). This configuration allows the third frame (lower inner frame 23) to break in a Z-shape around the breakage facilitating beads 23a, 23b in the event of an oblique collision.

In a further embodiment of this disclosure, the second frame (upper end outer frame 25) is formed in a curved shape bulging toward the outside in the vehicle width direction so that a rear portion of the second frame (upper end outer frame 25) breaks outward (see FIG. 7). This configuration allows the rear portion of the second frame (upper end outer frame 25) to break outward to avoid application of the shear stress to the base end of the second frame (upper end outer frame 25), and also allows the second frame (upper end outer frame 25) to break substantially in a Z-shape in vehicle plan view in combination with the inward breakage facilitated by the breakage facilitating bead 25a. This ensures load absorption as the second frame (upper end outer frame 25) undergoes breakage in its portion frontward of its base end while the base end receives the input load.

In a still further embodiment of this disclosure, the front vehicle-body structure of the vehicle further includes other frames 22, 24 connecting the suspension housing 30 and the vehicle cabin structural member 20, and each of the other frames 22, 24 is set to have a larger inclination angle with respect to the vehicle front-rear direction than the first to third frames 21, 25, 23 (see FIGS. 3 and 4). This configuration ensures load transmission by the first to third frames 21, 25, 23, having relatively small inclination angles with respect to the vehicle front-rear direction in the event of an oblique collision and also improves support rigidity for the suspension housing 30 by the other frames 22, 24 having relatively large inclination angles with respect to the vehicle front-rear direction.

As regards correspondence between the configuration of this embodiment and the above embodiment, the suspension housing of this embodiment corresponds to the suspension housing 30 of the embodiment. Likewise, the first frame corresponds to the upper inner frame 21, the second frame corresponds to the upper end outer frame 25, the third frame corresponds to the lower inner frame 23, and another frame corresponds to the upper outer frame 22 or the lower outer frame 24, though this disclosure is not limited to the configuration of the above embodiment.

As described above, the present disclosure is useful for a front vehicle-body structure of a vehicle including a suspension housing formed with a suspension damper supporting portion, an upper arm supporting portion, and a lower arm supporting portion.

What is claimed is:

1. A front vehicle-body structure of a vehicle including a suspension housing with a suspension damper supporting portion, an upper arm supporting portion, and a lower arm supporting portion, the front vehicle-body structure comprising:
    a first frame connecting an upper portion of the suspension housing and an upper portion on a vehicle-width-direction inner side of a dash panel;
    a second frame connecting the upper portion of the suspension housing and an upper portion of a hinge pillar; and
    a third frame connecting a lower portion of the suspension housing and a lower portion on the vehicle-width-direction inner side of the dash panel, wherein
    in an event of an oblique collision, the first frame and the second frame are facilitated to break inward in vehicle plan view, and the third frame is facilitated to break in a Z-shape in vehicle plan view, and
    the second frame has a curved shape bulging toward an outside in a vehicle width direction so that a rear portion of the second frame breaks outward.

2. The front vehicle-body structure of the vehicle according to claim 1, wherein
    each of the first frame and the second frame have a breakage facilitating bead extending in a vertical direction on a vehicle-width-direction outer-side portion thereof.

3. The front vehicle-body structure of the vehicle according to claim 2, wherein
    the third frame has breakage facilitating beads extending in a vertical direction on vehicle-width-direction inner and outer side portions of the third frame at positions offset from each other in a vehicle front-rear direction.

4. The front vehicle-body structure of the vehicle according to claim 3, further comprising another frame connecting the suspension housing and a vehicle cabin structural member, wherein
    the other frame is set to have a larger inclination angle with respect to a vehicle front-rear direction than each of the first to third frames.

5. The front vehicle-body structure of the vehicle according to claim 3, wherein in an event of an oblique collision, the third frame is facilitated to break in the Z-shape around the breakage facilitating beads.

6. The front vehicle-body structure of the vehicle according to claim 2, further comprising another frame connecting the suspension housing and a vehicle cabin structural member, wherein
    the other frame is set to have a larger inclination angle with respect to a vehicle front-rear direction than each of the first to third frames.

7. The front vehicle-body structure of the vehicle according to claim 2, wherein in an event of an oblique collision, the first frame and the second frame are each facilitated to break inward around their respective breakage facilitating bead.

8. The front vehicle-body structure of the vehicle according to claim 1, wherein
    the third frame has breakage facilitating beads extending in a vertical direction on vehicle-width-direction inner and outer side portions of the third frame at positions offset from each other in a vehicle front-rear direction.

9. The front vehicle-body structure of the vehicle according to claim 8, further comprising another frame connecting the suspension housing and a vehicle cabin structural member, wherein
    the other frame is set to have a larger inclination angle with respect to a vehicle front-rear direction than each of the first to third frames.

10. The front vehicle-body structure of the vehicle according to claim 1, further comprising another frame connecting the suspension housing and a vehicle cabin structural member, wherein
    the other frame is set to have a larger inclination angle with respect to a vehicle front-rear direction than each of the first to third frames.

* * * * *